United States Patent
Dastidar et al.

(10) Patent No.: US 10,817,455 B1
(45) Date of Patent: Oct. 27, 2020

(54) PERIPHERAL I/O DEVICE WITH ASSIGNABLE I/O AND COHERENT DOMAINS

(71) Applicant: Xilinx, Inc., San Jose, CA (US)

(72) Inventors: Jaideep Dastidar, San Jose, CA (US); Sagheer Ahmad, Cupertino, CA (US); Ian A. Swarbrick, Santa Clara, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 16/380,860

(22) Filed: Apr. 10, 2019

(51) Int. Cl.
  *G06F 13/42* (2006.01)
  *G06F 13/40* (2006.01)
  *G06F 13/28* (2006.01)

(52) U.S. Cl.
  CPC .......... *G06F 13/4221* (2013.01); *G06F 13/28* (2013.01); *G06F 13/4027* (2013.01)

(58) Field of Classification Search
  CPC ... G06F 13/28; G06F 13/4027; G06F 13/4221
  See application file for complete search history.

(56) References Cited

U.S. PATENT DOCUMENTS

| | | | |
|---|---|---|---|
| 6,608,813 B1 | 8/2003 | Chiussi et al. | |
| 6,633,967 B1 * | 10/2003 | Duncan | G06F 12/1027 710/3 |
| 6,914,907 B1 | 7/2005 | Bhardwaj et al. | |
| 7,009,618 B1 * | 3/2006 | Brunner | G06F 12/063 345/557 |
| 8,422,493 B2 | 4/2013 | Kono et al. | |
| 8,787,374 B2 | 7/2014 | Maeda et al. | |
| 9,306,845 B2 | 4/2016 | Kumagai et al. | |
| 9,391,835 B2 | 7/2016 | Aoshima et al. | |
| 9,525,591 B2 | 12/2016 | Yasuda et al. | |
| 9,794,194 B2 | 10/2017 | Yasuda et al. | |
| 10,097,466 B2 | 10/2018 | Tang et al. | |

(Continued)

FOREIGN PATENT DOCUMENTS

EP  2515294 A2  10/2012

OTHER PUBLICATIONS

U.S. Appl. No. 16/053,384, filed Aug. 2, 2018, Entitled: "Logical Transport Over a Fixed PCIE Physical Transport Network", San Jose, CA USA.

(Continued)

*Primary Examiner* — Glenn A. Auve
(74) *Attorney, Agent, or Firm* — Patterson + Sheridan, LLP (57) ABSTRACT

Examples herein describe a peripheral I/O device with a hybrid gateway that permits the device to have both I/O and coherent domains. That is, the I/O device can benefit from a traditional I/O model where the I/O device driver manages some of the compute resources in the I/O device as well as the benefits of adding other compute resources in the I/O device to the same coherent domain used by the hardware in the host computing system. As result, the compute resources in the coherent domain of the peripheral I/O device can communicate with the host in a similar manner as, e.g., CPU-to-CPU communication in the host. At the same time, the compute resources in the I/O domain can benefit from the advantages of the traditional I/O device model which provides efficiencies when doing large memory transfers between the host and the I/O device (e.g., DMA).

20 Claims, 7 Drawing Sheets

(56) References Cited

U.S. PATENT DOCUMENTS

| | | |
|---|---|---|
| 10,409,743 B1 | 9/2019 | Mittal et al. |
| 10,528,513 B1 | 1/2020 | Chan et al. |
| 10,698,824 B1 | 6/2020 | Mittal et al. |
| 2007/0294485 A1 | 12/2007 | Zeffer et al. |
| 2018/0287964 A1 | 10/2018 | Gray |
| 2019/0042518 A1 | 2/2019 | Marolia et al. |
| 2019/0065426 A1 | 2/2019 | Das Sharma et al. |
| 2020/0042446 A1* | 2/2020 | Mittal ................. G06F 12/0815 |
| 2020/0044895 A1* | 2/2020 | Mittal .................... H04L 69/22 |

OTHER PUBLICATIONS

U.S. Appl. No. 16/053,488, filed Aug. 2, 2018, Entitled: "Hybrid Precise and Imprecise Cache Snoop Filtering", San Jose, CA USA.
U.S. Appl. No. 16/025,762, filed Jul. 2, 2016, Entitled: "Logical Transport Ovprlayed Over a Physical Transport Having a Tree Topology".
U.S. Appl. No. 16/208,260, filed Dec. 3, 2018, Entitled: "Scratchpad Memory Management in a Computing System".
Yunlong Xu et al: "Lock-based Synchronization for GPU Architectures", CF' 16 Proceedings of the ACM International Conference on Computing Frontiers, ACM, 2 Penn Plaza, Suite 701 New York NY 10121-0701 USA, May 16, 2016, pp. 205-213, XP058259517, DOI: 101145/2903150.2903155, ISBN: 978-1-4503-4128-8 p. 205-p. 207.

* cited by examiner

PERIPHERAL I/O DEVICE WITH ASSIGNABLE I/O AND COHERENT DOMAINS

TECHNICAL FIELD

Examples of the present disclosure generally relate to a peripheral device with a hybrid gateway to support both I/O and coherent domains.

BACKGROUND

In the traditional I/O model, a host computing system interfaces with its peripheral I/O devices when executing accelerator tasks or functions using custom I/O device drivers unique to the peripheral I/O device. Having multiple I/O devices or even multiple instances of the same I/O device means that the host interfaces with multiple I/O device drivers or multiple running copies of the same I/O device driver. This can result in security and reliability issues since the I/O device drivers are typically developed by the vendor supplying the peripheral I/O devices but must be integrated with all the software and hardware in the host computing system.

Meanwhile, the hardware cache-coherent shared-memory multiprocessor paradigm leverages a generic, instruction set architecture (ISA)-independent, model of interfacing in the execution tasks or functions on multiprocessor CPUs. The generic, ISA-independent (e.g., C-code) model of interfacing scales with both the number of processing units and the amount of shared memory available to those processing units. Traditionally, peripheral I/O devices have been unable to benefit from the coherent paradigm used by CPUs executing on the host computing system.

SUMMARY

Techniques for establishing I/O and coherent domains in a peripheral device are described. One example is a peripheral I/O device that includes a plurality of compute resources and a hybrid gateway configured to communicatively couple the peripheral I/O device to a host. The gateway includes I/O hardware configured to permit the host to communicate with a first subset of the plurality of compute resources assigned to an I/O domain and coherent hardware configured to permit the host to communicate with a second subset of the plurality of compute resources assigned to a coherent domain, where the second subset shares the coherent domain with compute resources in the host.

One example described herein is a method that includes receiving an indication of a first amount of compute resources in a peripheral I/O device to assign to an I/O domain, receiving an indication of a second amount of compute resources in the peripheral I/O device to assign to a coherent domain, configuring the peripheral I/O device to include the I/O domain and the coherent domain, and operating the peripheral I/O device using the I/O domain and the coherent domain in parallel. The peripheral I/O device includes a hybrid gateway that permits a host to communicate with the compute resources in the I/O domain and the coherent domain, and the second amount of compute resources shares the coherent domain with compute resources in the host.

One example described herein is a system on chip (SoC) that includes a PL array comprising a plurality of PL blocks and a hybrid gateway configured to communicatively couple the SoC to a host. The gateway includes I/O hardware configured to permit the host to transmit I/O data traffic to a first subset of the plurality of PL blocks assigned to an I/O domain and coherent hardware configured to permit the host to transmit coherent data traffic to a second subset of the plurality of PL blocks assigned to a coherent domain, where the first and second subsets are mutually exclusive.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Examples herein describe a peripheral I/O device with a hybrid gateway that permits the device to have both I/O and coherent domains. That is, the I/O device can enjoy the benefits of the traditional I/O model where the I/O device driver manages some of the compute resources in the I/O device as well as the benefits of adding other compute resources in the I/O device to the same coherent domain used by the processors (e.g., central processing units (CPUs)) in the host computing system. As a result, the compute resources in the coherent domain of the peripheral I/O device can communicate with the host in a similar manner as CPU-to-CPU communication in the host. This means the compute resources can take advantage of coherency type functions such a direct communication (without address translation), more efficient memory usage, non-uniform memory access (NUMA) awareness, and the like. At the same time, the compute resources in the I/O domain can benefit from the advantages of the traditional I/O device model which provides efficiencies when doing large memory transfers between the host and the I/O device (e.g., direct memory access (DMA)).

To simultaneously support I/O and coherent domains in the same peripheral I/O device, the device includes a hybrid gateway which serves as an intermediary between the host and the I/O device. In one embodiment, the hybrid gateway receives data traffic from the host (e.g., PCIe data traffic) which it then separates into I/O data traffic and coherent data traffic. The I/O data traffic is forwarded to the compute resources in the I/O domain while the coherent data traffic is forwarded to the compute resources in the coherent domain. For example, the peripheral I/O device may include a programmable logic (PL) array where some of the PL blocks in the array are assigned to the I/O domain while the remaining PL blocks are assigned to the coherent domain.

Further, the assignment of the compute resources into the I/O and coherent domains may be dynamic. For example, a system administrator may determine there are not enough resources in the I/O domain and reconfigure the peripheral I/O device such that compute resources previously assigned to the coherent domain are now assigned to the I/O domain. The I/O device can be reconfigured with the new assignments and the hybrid gateway can simultaneously support operation of the I/O and coherent domains.

Figure 1:
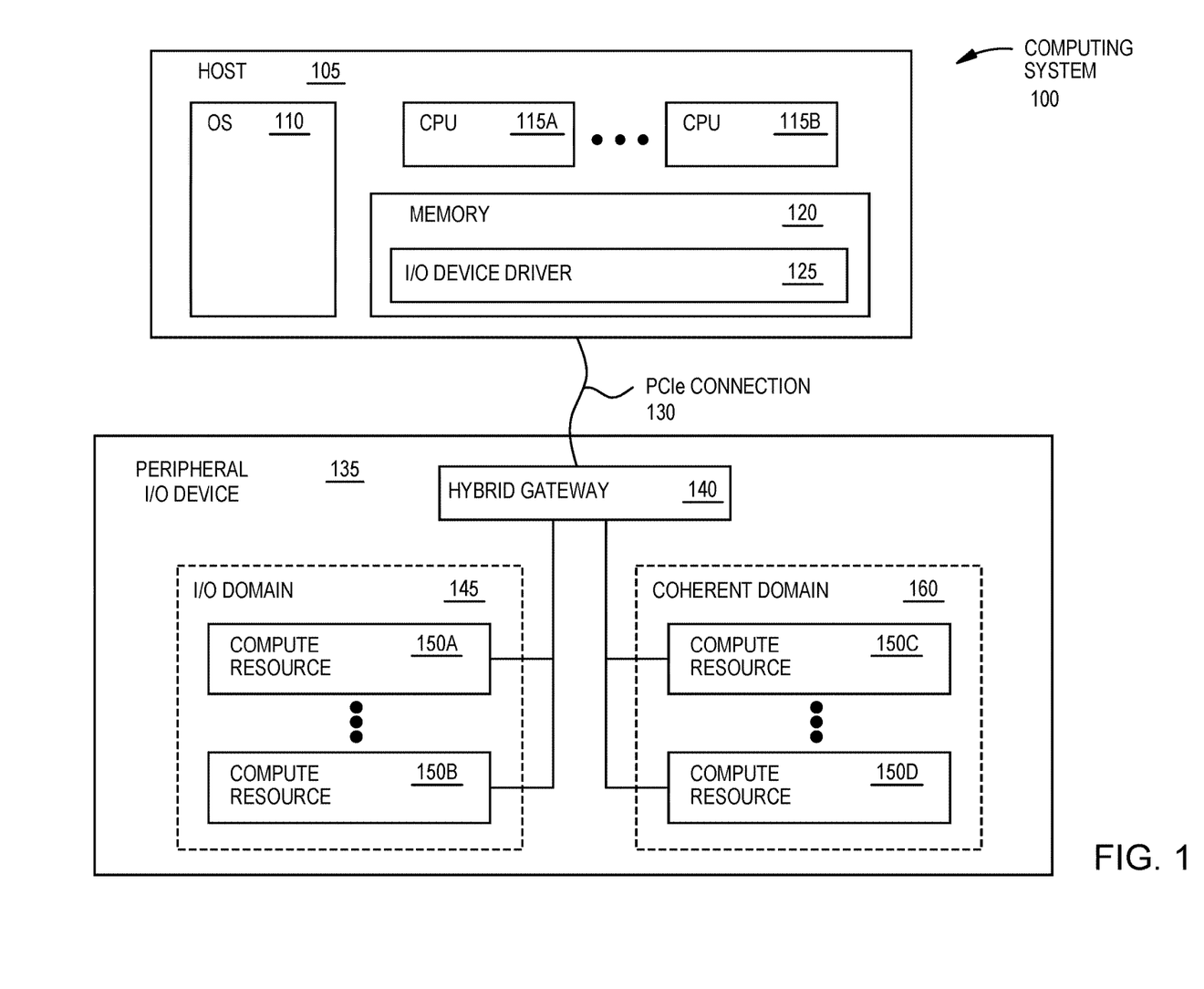
FIG. 1 is a block diagram of a host coupled to a peripheral I/O device with I/O and coherent domains, according to an example.

FIG. 1 is a block diagram of a host 105 coupled to a peripheral I/O device 135 with I/O and coherent domains, according to an example. The computing system 100 in FIG. 1 includes the host 105 which is communicatively coupled to the peripheral I/O device 135 using a PCIe connection 130. The host 105 can represent a single computer (e.g., a server) or multiple physical computing systems that are interconnected. In any case, the host 105 includes an operating system 110, multiple CPUs 115 and memory 120. The OS 110 can be any OS capable of performing the functions described herein. In one embodiment, the OS 110 (or a hypervisor or kernel) establishes a cache-coherent shared-memory multiprocessor paradigm for the CPUs 115 and memory 120. In one embodiment, the CPUs 115 and the memory 120 are OS managed (or kernel/hypervisor managed) to form a coherent domain that follows the cache-coherent shared-memory multiprocessor paradigm. However, as mentioned above, the traditional I/O model means the peripheral I/O device 135 (and all its compute resources 150) is excluded from the coherent domain established in the host 105. Instead, the host 105 relies on an I/O device driver 125 stored in its memory 120 which manages the compute resources 150 in the I/O device 135. That is, the peripheral I/O device 135 is controlled by, and is accessible through, the I/O device driver 125.

In the embodiments herein, the shared-memory multiprocessor paradigm is available to the peripheral I/O device 135 along with all the performance advantages, software flexibility, and reduced overhead of that paradigm. Further, adding compute resources in the I/O device 135 to the same coherent domain as the CPUs 115 and memory 120 allows for a generic, ISA-independent development environment. As shown in FIG. 1, some of the compute resources 150 in the peripheral I/O device 135 are assigned to a coherent domain 160 which is the same coherent domain 160 used by the compute resources in the host 105—e.g., the CPUs 115 and the memory 120.

While the compute resources 150C and 150D are logically assigned to the coherent domain 160, the compute resources 150A and 150B are assigned to an I/O domain 145. As such, the I/O device 135 benefits from having compute resources 150 assigned to both domains 145, 160. While the I/O domain 145 provides efficiencies when doing large memory transfers between the host 105 and the I/O device 135, the coherent domain 160 provides the performance advantages, software flexibility, and reduced overhead mentioned above. By logically dividing the hardware compute resources 150 (e.g., programmable logic, a network on the chip (NoC), data processing engines, and/or memory) into the I/O domain 145 and the coherent domain 160, the I/O device 135 can benefit from both types of paradigms.

To enable the host 105 to send and receive both I/O and coherent data traffic, the peripheral I/O device 135 includes a hybrid gateway 140 which separates the data received on the PCIe connection 130 into I/O data traffic and coherent data traffic. The I/O data traffic is forwarded to the compute resources 150A and 150B in the I/O domain 145 while the coherent data traffic is forwarded to the compute resources 150C and 150D in the coherent domain 160. In one embodiment, the hybrid gateway 140 can process the I/O and coherent data traffic in parallel so that the compute resources 150 in the I/O domain 145 can execute in parallel with the compute resources 150 in the coherent domain 160. That is, the host 105 can assign tasks to both the compute resources 150 in the I/O domain 145 and in the coherent domain 160 which can execute those tasks in parallel.

The peripheral I/O device 135 can be many different types of I/O devices such as a pluggable card (which plugs into an expansion slot in the host 105), a system on a chip (SoC), a graphics processing unit (GPU), a field programmable gate array (FPGA) and the like. Thus, while the remaining embodiments discuss an I/O device 135 that includes programmable logic (e.g., a programmable logic array), the embodiments can be applied to an I/O device 135 that does not have programmable logic but contains solely hardened circuit (which may be software programmable). Further, while the embodiments herein discuss dividing the compute resources 150 into two domains, in other embodiments the hybrid gateway 140 can be modified to support additional domains or multiple sub-domains within the I/O and coherent domains 145, 160.

Figure 2:
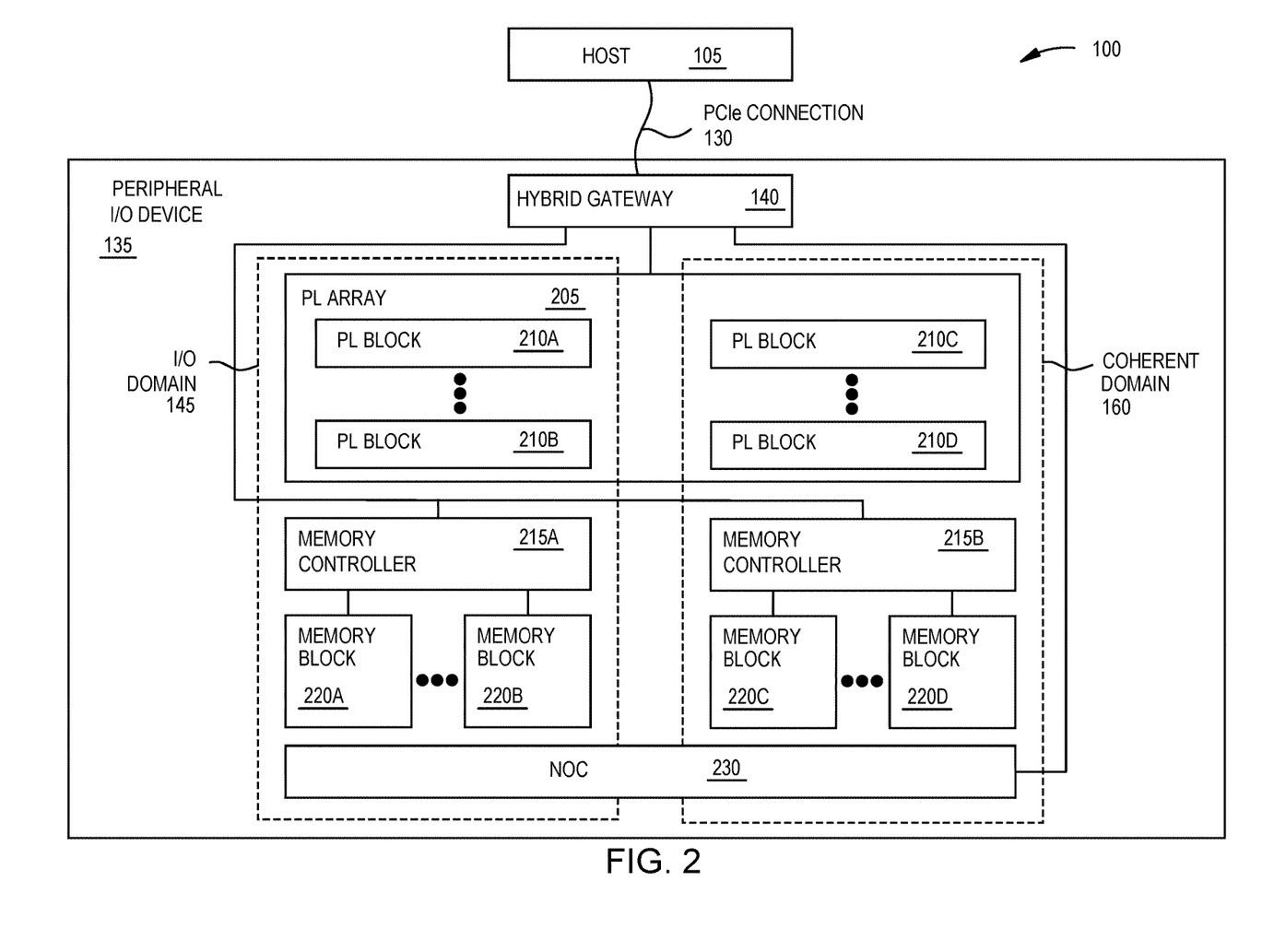
FIG. 2 is a block diagram of a peripheral I/O device with programmable logic, memory, and a network on a chip logically divided into I/O and coherent domains, according to an example.

FIG. 2 is a block diagram of a peripheral I/O device 135 with a programmable logic (PL) array 205, memory blocks 220, and a NoC 230 logically divided into I/O and coherent domains 145, 160, according to an example. In this example, the PL array 205 is formed from a plurality of PL blocks 210. These blocks can be individually assigned to the I/O domain 145 or the coherent domain 160. That is, the PL blocks 210A and 210B are assigned to the I/O domain 145 while the PL blocks 210C and 210D are assigned to the coherent domain 160. In one embodiment, the set of PL blocks 210 assigned to the I/O domain is mutually exclusive to the set of PL blocks 210 assigned to the coherent domain such that there is no overlap between the blocks (e.g., no PL block 210 is assigned to both the I/O and coherent domains).

In one embodiment, the assignment of the hardware resources to either the I/O domain 145 or the coherent domain 160 does not affect (or indicate) the physical location of the hardware resources in the I/O device 135. For example, the PL blocks 210A and 210C may be assigned to different domains even if these blocks neighbor each other in the PL array 205. Thus, while the physical location of the hardware resources in the I/O device 135 may be considered when logically assigning them to the I/O domain 145 and the coherent domain 160, it is not necessary.

The I/O device 135 also includes memory controllers 215 which are assigned to the I/O domain 145 and the coherent domain 160. In one embodiment, because of the physical interconnection between the memory controllers 215 and the corresponding memory blocks 220, assigning one of the memory controllers 215 to either the I/O or coherent domain 145, 160 means all the memory blocks 220 connected to the memory controller 215 are also assigned to the same domain. For example, the memory controllers 215 may be coupled to a fix set of memory blocks 220 (which are not coupled to any other memory controller 215). Thus, the memory blocks 220 may be assigned to the same domain as the memory controller 215 to which they are coupled. However, in other embodiments, it may be possible to assign memory blocks 220 coupled to the same memory controller 215 to different domains.

In one embodiment, the NoC includes interface elements which permit hardware elements in the I/O device 135 (e.g., configurable data processing engines, the memory blocks 220, the PL blocks 210, and the like) to transmit and receive data using the NoC 230. In one embodiment, rather than using programmable logic to form the NoC 230, some or all of the components forming the NoC are hardened. In any case, the NoC 230 can be logically divided between the I/O domain 145 and the coherent domain 160. In one embodiment, instead of assigning different portions of the NoC 230 to the two domains, the parameters of the NoC are configured to provide different service levels for the data traffic corresponding to the I/O domain 145 and the coherent domains 160. That is, the data traffic for both domains flowing in the NoC 230 may use the same hardware elements (e.g., switches and communication links) but may be treated differently by the hardware elements. For example, the NoC 230 can provide different quality of service (QoS), latency, bandwidth, for the two different domains. Further, the NoC 230 can also isolate the traffic of the I/O domain 145 from the traffic of the coherent domain 160 for security reasons.

In another embodiment, the NoC 230 can prevent the compute resources in the I/O domain 145 from communicating with the compute resources in the coherent domain 160. However, in one embodiment it may be advantageous to permit the compute resources assigned to the I/O domain 145 to communicate with compute resources assigned to the coherent domain 160. Previously, this communication would occur between the I/O device driver 125 and the OS in the host 105. Instead, inter-domain communication can occur within the I/O device 135 using the NoC 230 (if the compute resources are far apart in the device 135) or a fabric-to-fabric connection in the PL array 205 (if two PL blocks 210 assigned to the two different domains are close together and need to communicate).

Figure 3:
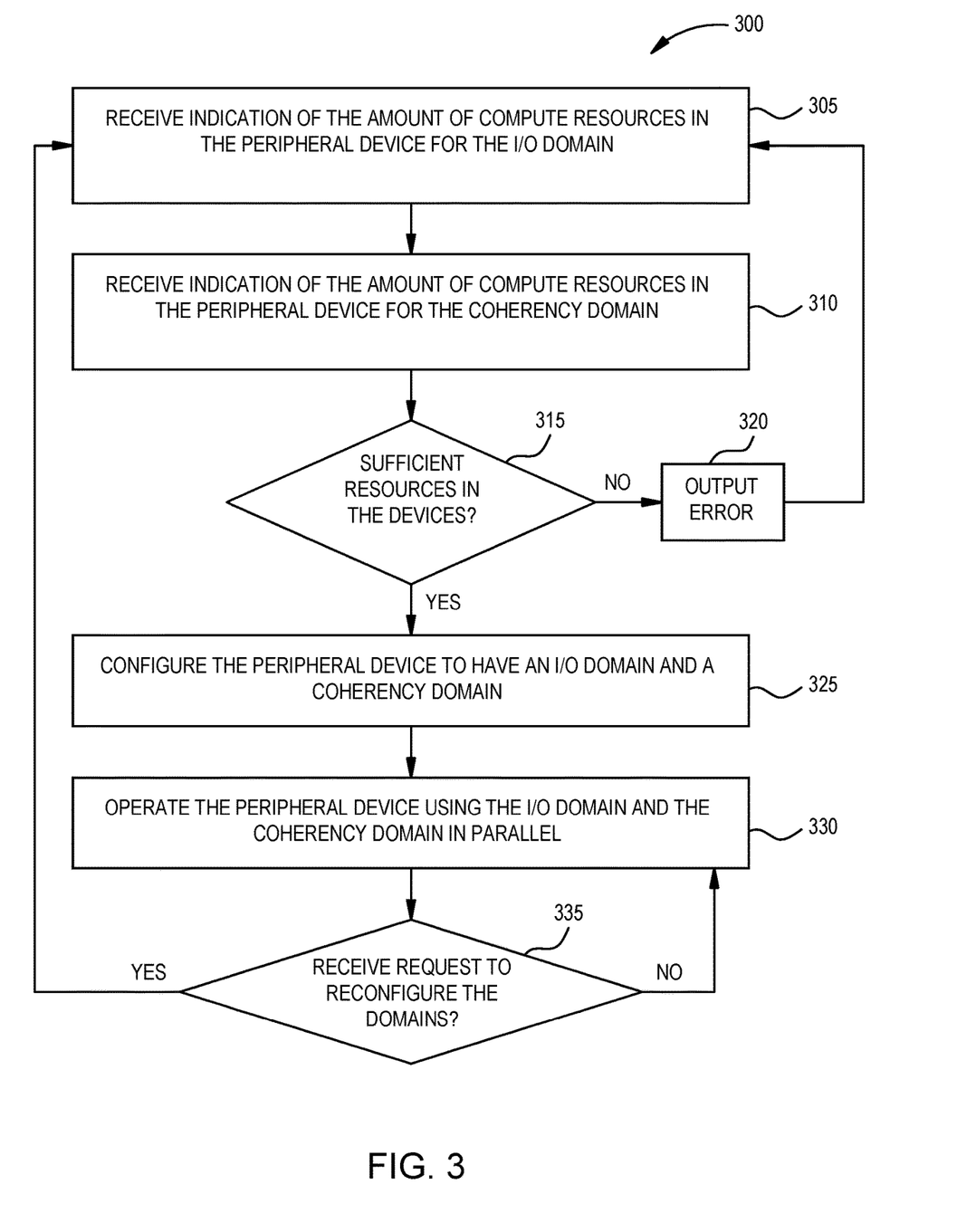
FIG. 3 is a flowchart for logically dividing compute resources in a peripheral device into I/O and coherent domains, according to an example.

FIG. 3 is a flowchart of a method 300 for logically dividing compute resources in a peripheral device into I/O and coherent domains, according to an example. The method 300 begins at block 305 where the host receives an indication of the amount of compute resources in the peripheral device for the I/O domain. In one embodiment, the host may provide a graphical user interface (GUI) for a user who selects the amount of compute resources in the peripheral device to be assigned to the I/O domain. For example, the GUI may include text box where the user can type in a percentage of the PL blocks or memory controllers/blocks to assign to the I/O domain. In another embodiment, the GUI permits the user to list specific resources that should be assigned to the I/O domain (e.g., 256 kB of memory).

At block 310, the host receives an indicator of the amount of compute resources in the peripheral device for the coherent domain. Like above, the host may display a separate GUI which enables the user to select the percentage or amount of compute resources to assign to the coherent domain. In another embodiment, the host may include a wizard tool that displays a single GUI which enables the user to divide the compute resources between the I/O domain and the coherent domain. For example, the GUI may include sliding bars which permit the user to divide the compute resources such as the PL blocks, memory controllers, and memory blocks between the two domains. The wizard may include another GUI that permits the user to select the parameters for the NoC (e.g., allocate its bandwidth to the two domains, establish QoS, establish security/isolation, and the like).

At block 315, the host determines whether the I/O device has sufficient resources to satisfy the requests made at blocks 305 and blocks 310. For example, the user may have requested that 500 MB of memory be assigned to the I/O domain and 600 MB of memory to the coherent domain, but the I/O device may have only 1 GB of memory. Or the user may have requested that both the I/O domain and the coherent domain be assigned greater than 50% of the PL blocks in the PL array. In those situations, the method 300 proceeds to block 320 where the host outputs an error to the user. The method 300 can repeat blocks 305 and 310 so the user can select compute resources that meet the constraints of the hardware in the I/O device. The method 300 can also further subdivide resources assigned at each of the blocks 305 and blocks 310. For example, the PL blocks 210A and 210B are assigned to the I/O domain 145 at block 305 while the PL blocks 210C and 210D are assigned to the coherent domain 160 at block 310.

However, if the assignments provided by the user satisfy the hardware constraints of the I/O device, the method 300 proceeds to block 325 where the host configures the peripheral device to have an I/O domain and a coherent domain. In one embodiment, the coherent domain is a shared domain with compute resources in the host. For example, the compute resources selected at block 310 form a coherent domain that follows the cache-coherent shared-memory multiprocessor paradigm with CPUs, memory, and other hardware elements in the host. At the same time, the compute resources indicated at block 305 form an I/O domain. In one embodiment, unlike the compute resources in the coherent domain, the compute resources in the host are in a separate domain from the I/O domain. As a result, the host may still rely on an installed device driver to communicate with the compute resources in the I/O domain (although communication between the coherent domain and the I/O domain can also be facilitated using a NoC or a fabric in the PL array as mentioned above).

In one embodiment, the host configures the peripheral device using a bit stream and/or binary code. The bit stream and binary code configure the compute resources in the peripheral device so these resources can function in two different domains. For example, the PL blocks selected for the coherent domain may be interconnected to each other using a fabric in the PL array while being isolated from the PL blocks assigned to the I/O domain. Moreover, the memory controllers may only perform read and write requests that are received from other hardware elements in the same domain. Also, the NoC may use data isolation techniques to ensure the I/O data traffic is managed separately from the coherency data traffic. That is, the NoC can identify the difference between data traffic for the two domains. As a result, the NoC can provide different bandwidth and QoS levels to the data traffic.

At block 330, the peripheral device operates using the I/O domain and the coherent domain in parallel. The peripheral device can execute tasks (which may have been assigned by the host) using compute resources in the I/O domain and the coherent domain in parallel. Stated differently, the peripheral device can support two different domains operating in parallel. As such, the host can assign different tasks to the domains which take advantage of their respective configurations. For example, tasks that require large data transfers can be assigned to compute resources in the I/O domain while tasks that benefit from close integration or communication with the compute resources in the host can be assigned to the compute resources in the coherent domain of the peripheral device.

At block 335, the host determines whether it receives a request to reconfigure the domains. In this example, the domains in the peripheral device are reconfigurable so that compute resource initially assigned to the I/O domain can be reassigned to the coherent domain, and vice versa. For example, after operating the peripheral device, the user (or monitoring software on the host) may determine that the compute resources in one domain are idle much more than compute resources in the other domain. For instance, the host may assign tasks much more frequently to one domain than another. In response, the user or the monitoring software may request that some of the compute resources in the underutilized domain be reassigned to the over utilized domain by repeating the method 300. This may improve the overall ability of the peripheral device to perform the tasks assigned by the host.

Figure 4:
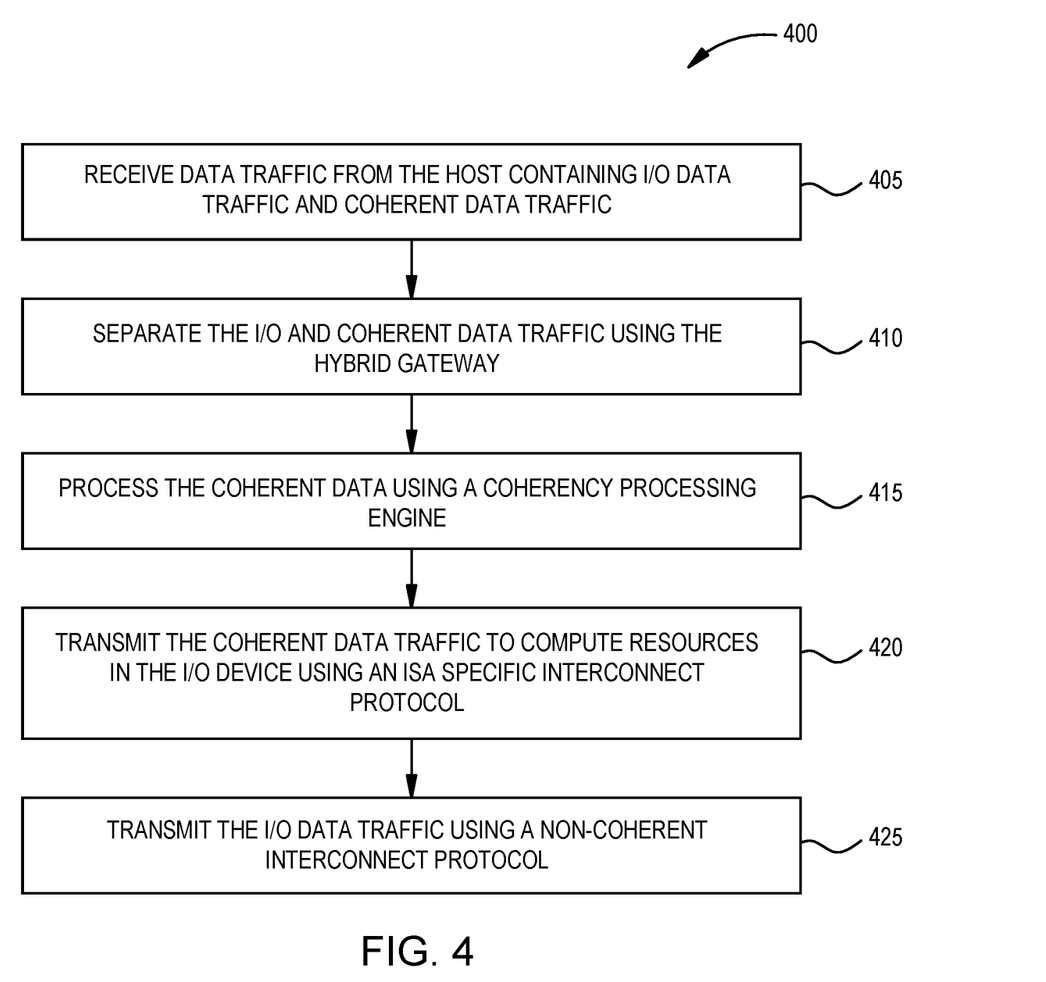
FIG. 4 is a flowchart for processing I/O and coherent data traffic using a hybrid gateway in a peripheral device, according to an example.

FIG. 4 is a flowchart of a method 400 for processing I/O and coherent data traffic using a hybrid gateway in a peripheral device, according to an example. In one embodiment, the method 400 describes techniques for operating the hybrid gateway to support multiple domains in a peripheral device that have been established using, for example, the method 300 in FIG. 3. For clarity, the blocks of the method 400 are discussed in parallel with FIG. 5 which is a block diagram of a hybrid gateway in a peripheral device, according to an example.

At block 405, the hybrid gateway 140 receives data traffic from the host 105 containing I/O data traffic and coherent data traffic. That is, the hybrid gateway 140 can use the same connection to receive data traffic destined to both the I/O domain and the coherent domain. For example, the host 105 may be coupled to the peripheral I/O device 135 using one or more PCIe connections 130.

At block 410, the hybrid gateway 140 separates the I/O and coherent data traffic. For example, the coherent data traffic may have special headers or header values that indicate to the hybrid gateway 140 that the corresponding data is part of the coherent domain while traffic without these headers or header values is identified as I/O data traffic. In this example, the I/O and coherent data traffic can be sent using the same protocol (e.g., PCIe) but then be separated from each other by the hybrid gateway 140.

Figure 5:
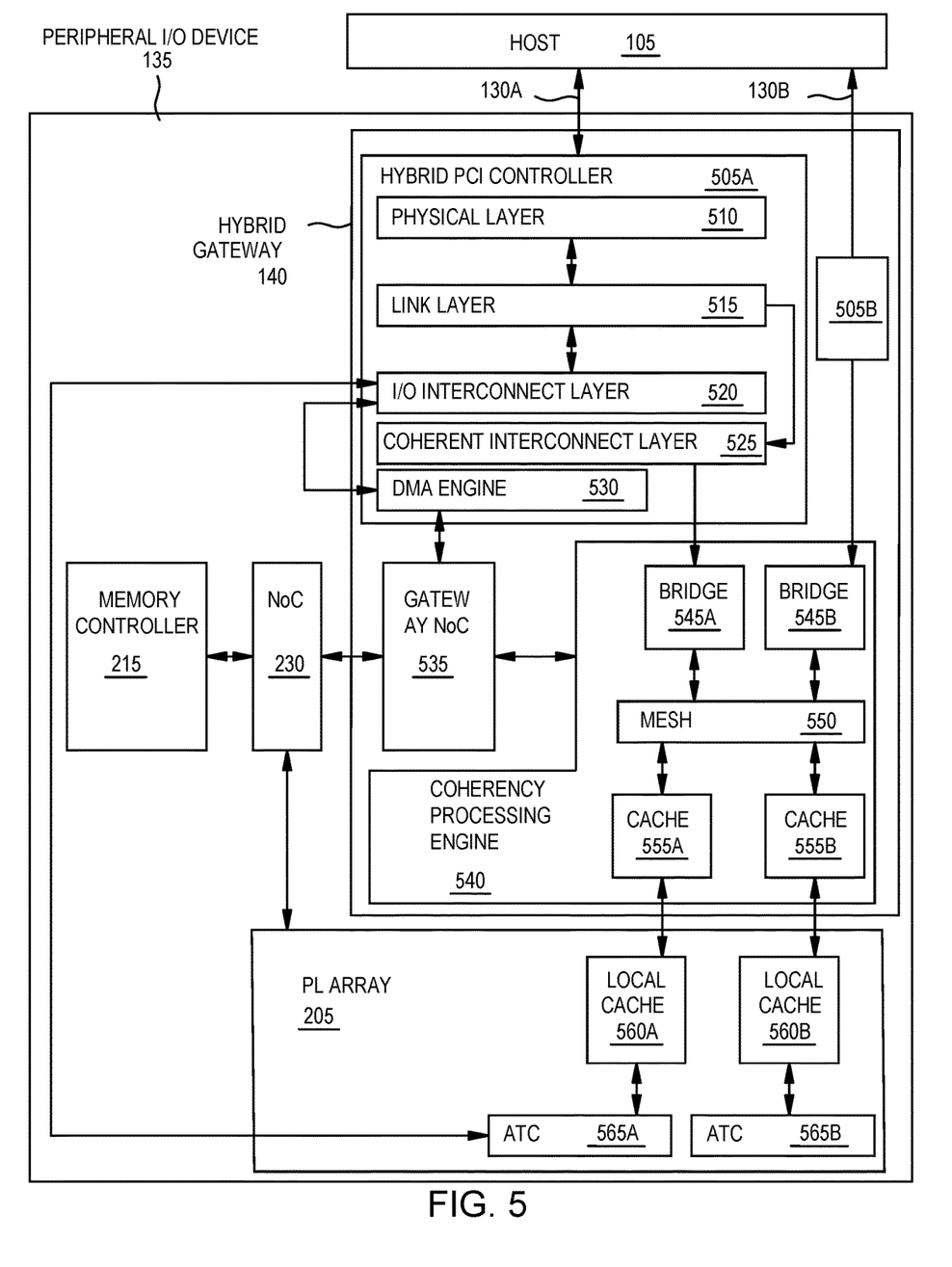
FIG. 5 is a block diagram of a hybrid gateway in a peripheral device, according to an example.

To do so, the hybrid gateway 140 includes one or more hybrid PCI controllers 505 which can receive data from, and transmit data to, the host 105. Each hybrid PCI controller 505 includes a physical layer 510, a link layer 515, an I/O interconnect layer 520, and a coherent interconnect layer 525. In one embodiment, the PCI data (regardless whether it contains I/O data traffic or coherent data traffic) is processed by the physical layer 510 and the link layer 515. However, the hybrid PCI controller 505 then separates the data so that the I/O data traffic is processed by the I/O interconnect layer 520 and the coherent data traffic is processed by the coherent interconnect layer 525. In this manner, the hybrid PCI controller 505 has both I/O hardware components that make the controller 505 compatible with an I/O domain and coherency hardware components that make the controller 505 compatible with the coherent domain.

At block 415, the hybrid gateway 140 processes the coherent data using a coherency processing engine 540. As shown in FIG. 5, the coherent interconnect layer 525 is connected to the coherency processing engine 540 which serves as an intermediary between the hybrid PCI controller 505 and the compute resources in the peripheral I/O device 135 assigned to the coherent domain. The coherency processing engine 540 can be implemented using any of a variety of different protocols that permit compute resources on a peripheral I/O device to be added to a coherent domain that includes compute resources on the host. For example, the coherency processing engine 540 may use cache coherent interconnect for accelerators (CCIX) for forming the coherent domain. CCIX is a high-performance, chip-to-chip interconnect architecture that provides a cache coherent framework for heterogeneous system architectures. CCIX brings kernel managed semantics to a peripheral device. Cache coherency is automatically maintained at all times between the CPU(s) on the host 105 and the various other accelerators in the system which may be disposed on any number of peripheral I/O devices.

However, other coherent interconnect protocols may be used besides CCIX such as QuickPath Interconnect (QPI) or Omni-Path, to extend the coherent domain in the host 105 to include compute resources in the peripheral I/O device 135. That is, the coherency processing engine 540 can be customized to support any type of coherent interconnect protocol which facilitates forming a coherent domain that includes the compute resources in the I/O device 135.

In one embodiment, the components in the coherency processing engine 540 are hardened (e.g., not formed using programmable logic) which may improve its performance since the engine 540 may be tasked with not only performing coherency actions for its domain but also services requests to make sure coherency is maintained in a multi-processor system. In the embodiment illustrated in FIG. 5, the coherency processing engine 540 includes bridges 545 respectively coupled to one of the hybrid PCI controllers 505, a mesh 550, and caches 555. The bridges may convert the data from the coherent interconnect protocol (e.g., CCIX, QPI, Omni-Path, etc.) to an ISA specific interconnect protocol (e.g., x86, ARM, PowerPC®). Stated differently, the bridges 545 manage the protocol semantics on the interface and manage the memory actions related to the coherent actions.

The mesh 550 is a multi-processor interconnect that routes the data to the appropriate cache 555 (or bridge 545 when transmitting coherent data from compute resources in the I/O device 135 to the host 105).

At block 420, the coherency processing engine 540 transmits the coherent data traffic to compute resources in the I/O device, which are in the coherent domain, using the ISA specific interconnect protocol. As discussed above, the bridges 545 convert the coherent data traffic from the coherent interconnect protocol to the ISA specific interconnect protocol which is then forwarded from the coherency processing engine 540 to the PL array 205 in FIG. 5. That is, the caches 555 are coupled to local caches 560 in the PL array 205 which are in turn coupled to address translation caches (ATC) 565 for converting memory address to local memory addresses. The coherent data traffic can then be processed by the PL blocks in the array 205 assigned to the coherent domain.

At block 425, the hybrid gateway 140 transmits the I/O data traffic using a non-coherent interconnect protocol (e.g., the Advanced eXtensible Interface (AXI) protocol). To do so, the hybrid PCI controller 505 in the gateway 140 uses the I/O interconnect layer 520 to convert the received I/O data traffic from the PCI protocol to the non-coherent interconnect protocol. This data can then be forwarded to a DMA engine 530 for processing by the PL blocks assigned to the I/O domain. If the data is forwarded to the DMA engine 530, the engine 530 can use a gateway NoC 535 (which is in the hybrid gateway 140 and may be separate from the NoC 230) to transfer the data to one of the memory controllers 215. That is, the gateway NoC 535 is communicatively coupled to the NoC 230 so that DMA read and write requests can be performed using the memory controllers 215 and corresponding memory blocks (not shown in FIG. 5).

Thus, using the method 400, a hybrid gateway 140 can receive I/O and coherent data traffic from the host 105, separate and process the data traffic using different hardware components, and forward the data to the appropriate compute elements for processing. Further, the process also works in reverse where data processed by the compute resources in the PL, memory, etc. is transmitted to the hybrid gateway 140 and then transmitted to the host 105 using the PCIe connections 130.

In one embodiment, the data flows from the host 105, to the hybrid gateway 140, to the interconnect layer (both I/O interconnect layer 520 and coherent interconnect layer 525), to the PL array 205 (both the PL blocks assigned to the I/O domain and the PL blocks assigned to the coherent domain), and then to the memory blocks (both the memory blocks assigned to the I/O domain and the memory blocks assigned to the coherent domain). However, in another embodiment, the data flows from the host 105, to the hybrid gateway 140, to the interconnect layer (both I/O coherent), to the memory blocks (both the I/O and coherent memory blocks), and then to the PL array 205 (both I/O and coherent PL blocks). In one embodiment, the transfer of the data from the PL array 205 to the memory blocks, or from the memory blocks to the PL array 205, is enabled by the connections between the memory controller(s) 215, the NoC 230, and the PL array 205.

Figure 6:
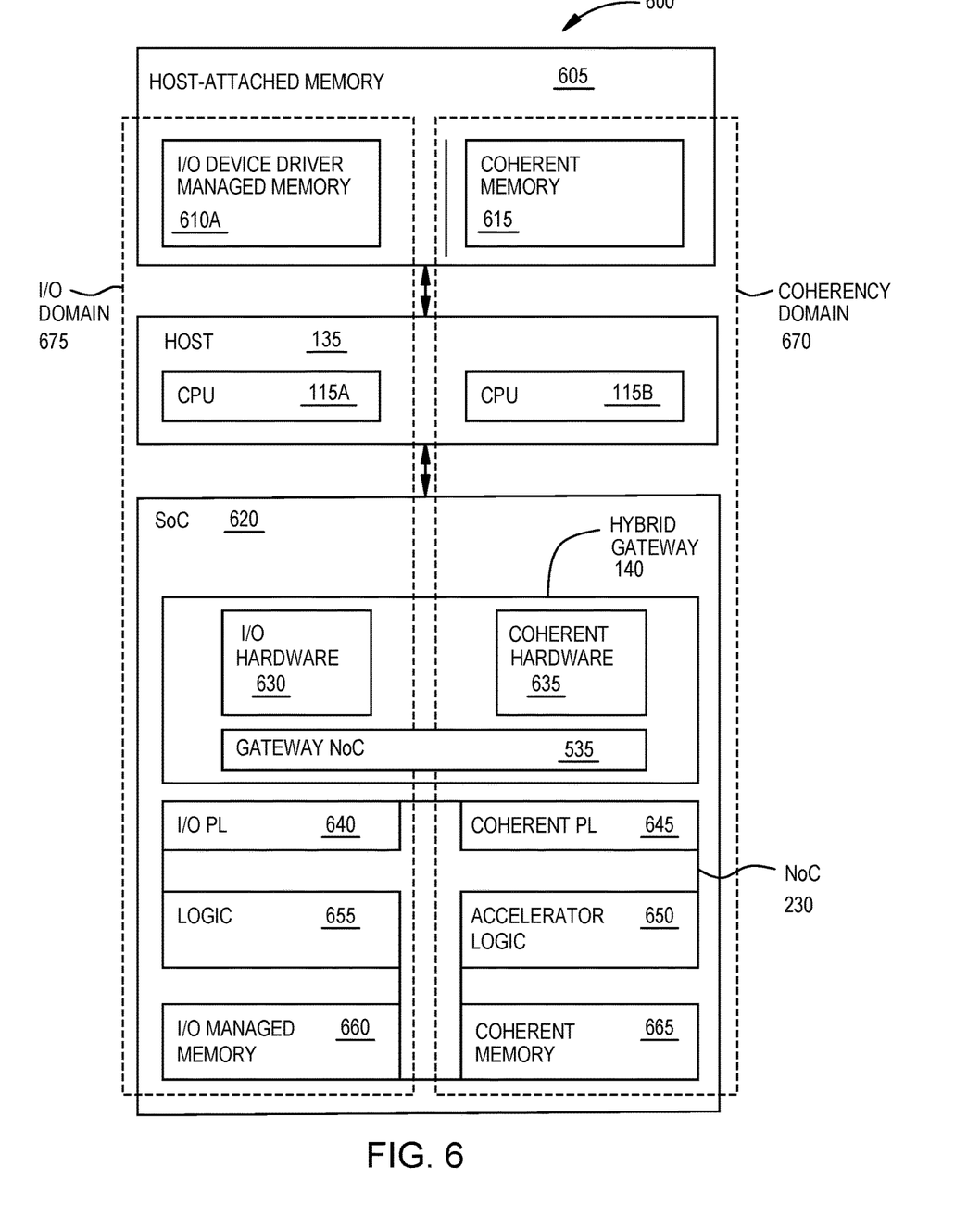
FIG. 6 illustrates a computing system with compute resources logically divided into I/O and coherent domains, according to an example.

FIG. 6 illustrates a computing system 600 with compute resources logically divided into I/O and coherent domains, according to an example. The system 600 includes a SoC 620 which participates as a peripheral device in terms of protocol, discovery and configuration. Meanwhile, the hardware elements that are part of the coherent domain 670 are managed by the OS/Kernel (not shown) in the host 135 as a processor-memory peer to the host's 135 processor-memory complex. The programmable logic and NoC in the SoC 620 provides on-device communication, traffic flow, and interface between the I/O domain 675 and the coherent domain 670 in performing heterogeneous acceleration functions using I/O PL 640, coherent PL 645, logic 655, and accelerator logic 650.

Furthermore, the system 600 offers the flexibility of locating, in either the I/O domain 675 or coherent domain 670, the computational data set, computational results, or any communication handshake (doorbells, I/O interrupts, DMA descriptors, semaphores, etc.) between the control processor and the heterogeneous device.

System components, such as CPUs, I/O device, accelerators, PL elements, and memory can perform functions in either domain using the embodiments described herein. Within the system 600 as well, components such as PL Elements, NoC configuration and bandwidth, and on-die memory (e.g., I/O managed memory 660 and coherent memory 665) and host-attached memory 605 can be logically partitioned between the I/O and Coherent domains 675, 670 to accommodate the particular system and/or application requirements with the hybrid gateway 140 serving as a common gateway to the Server/Host for both domains.

The hardware resources in the hybrid gateway 140 can be divided in I/O hardware 630 (e.g., the I/O interconnect layer 520 and the DMA engine 530 in FIG. 5) and coherent hardware 635 (e.g., the coherent interconnect layer 525 and the coherency processing engine 540). Further, the I/O managed memory 660 and the I/O device driver managed memory 610 are assigned to the I/O domain 675 while the coherent memory 615 and the host-attached memory 605 and the coherent memory 665 in the SoC 620 are assigned to the coherent domain 670.

One advantage of the embodiments herein is that the peripheral I/O device can be controlled and communicated to by the PL (rather than the I/O device driver running on the host CPU-memory complex) which is customized to perform control and communication of the peripheral device and offloads the I/O Device Driver running on a Host CPU-Memory complex. The PL in turn communicates/collaborates with the Host CPU-Memory complex as a peer via the coherent domain.

Another advantage of the embodiments herein is that the Coprocessor/Accelerator model and all the software and performance efficiencies offered by that that model can be leveraged without requiring that the heterogeneous device contain a same-ISA same-memory peer of the CPU-Memory complex. Instead, having peripheral attached coherent Acceleration and communicating allows the same processor-to-processor shared-memory model that multiprocessor systems used to also be used for CPU to Device-Accelerator communications.

Another advantage of the embodiments herein is that they offer an integrated solution with a shared NoC with QoS attributes, QOS controlled shared resources/buffers, and memory that can be partitioned by user needs to each part of the I/O peripheral device function and coherent accelerator/memory function.

Figure 7:
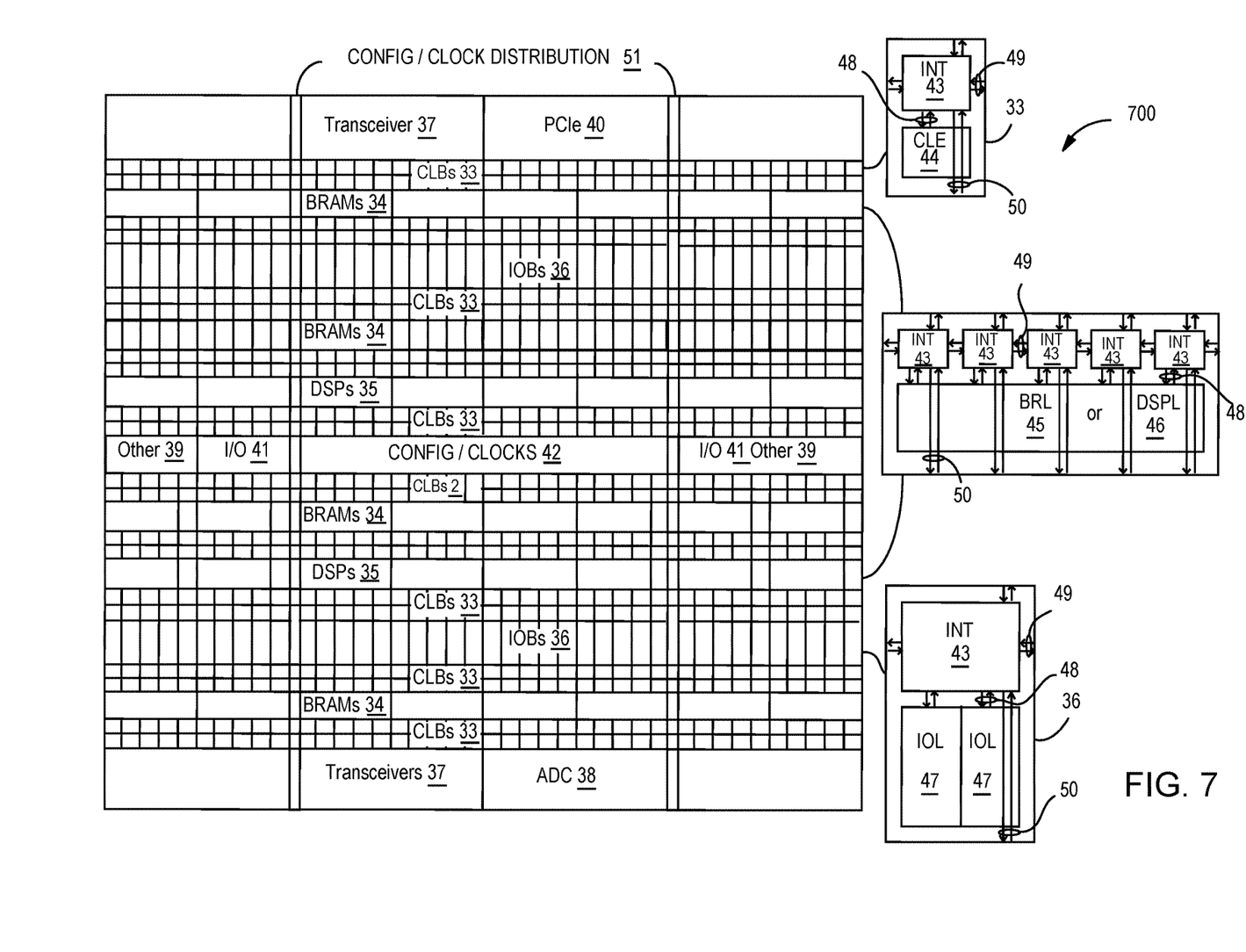
FIG. 7 illustrates a field programmable gate array implementation of a programmable IC according to an example.

FIG. 7 illustrates an FPGA 700 implementation of the I/O peripheral device 135, and more specifically with the PL array 205 in FIG. 2, that includes a large number of different programmable tiles including transceivers 37, CLBs 33, BRAMs 34, input/output blocks ("IOBs") 36, configuration and clocking logic ("CONFIG/CLOCKS") 42, DSP blocks 35, specialized input/output blocks ("IO") 41 (e.g., configuration ports and clock ports), and other programmable logic 39 such as digital clock managers, analog-to-digital converters, system monitoring logic, and so forth. The FPGA can also include PCIe interfaces 40, analog-to-digital converters (ADC) 38, and the like.

In some FPGAs, each programmable tile can include at least one programmable interconnect element ("INT") 43 having connections to input and output terminals 48 of a programmable logic element within the same tile, as shown by examples included at the top of FIG. 7. Each programmable interconnect element 43 can also include connections to interconnect segments 49 of adjacent programmable interconnect element(s) in the same tile or other tile(s). Each programmable interconnect element 43 can also include connections to interconnect segments 50 of general routing resources between logic blocks (not shown). The general routing resources can include routing channels between logic blocks (not shown) comprising tracks of interconnect segments (e.g., interconnect segments 50) and switch blocks (not shown) for connecting interconnect segments. The interconnect segments of the general routing resources (e.g., interconnect segments 50) can span one or more logic blocks. The programmable interconnect elements 43 taken together with the general routing resources implement a programmable interconnect structure ("programmable interconnect") for the illustrated FPGA.

In an example implementation, a CLB 33 can include a configurable logic element ("CLE") 44 that can be programmed to implement user logic plus a single programmable interconnect element ("INT") 43. A BRAM 34 can include a BRAM logic element ("BRL") 45 in addition to one or more programmable interconnect elements. In one embodiment, the BRAM 34 is a part of memory 140 which can retain stored data during reconfigurations as described above. Typically, the number of interconnect elements included in a tile depends on the height of the tile. In the pictured example, a BRAM tile has the same height as five CLBs, but other numbers (e.g., four) can also be used. A DSP block 35 can include a DSP logic element ("DSPL") 46 in addition to an appropriate number of programmable interconnect elements. An 10B 36 can include, for example, two instances of an input/output logic element ("IOL") 47 in addition to one instance of the programmable interconnect element 43. As will be clear to those of skill in the art, the actual IO pads connected, for example, to the 10 logic element 47 typically are not confined to the area of the input/output logic element 47.

In the pictured example, a horizontal area near the center of the die (shown in FIG. 7) is used for configuration, clock, and other control logic. Vertical columns 51 extending from this horizontal area or column are used to distribute the clocks and configuration signals across the breadth of the FPGA.

Some FPGAs utilizing the architecture illustrated in FIG. 7 include additional logic blocks that disrupt the regular columnar structure making up a large part of the FPGA. The additional logic blocks can be programmable blocks and/or dedicated logic.

Note that FIG. 7 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 7 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A peripheral I/O device, comprising:
a plurality of compute resources; and
a hybrid gateway configured to communicatively couple the peripheral I/O device to a host, the hybrid gateway comprising:
I/O hardware configured to permit the host to communicate with a first subset of the plurality of compute resources which are assigned to an I/O domain, and
coherent hardware configured to permit the host to communicate with a second subset of the plurality of compute resources which are assigned to a coherent domain, wherein the second subset shares the coherent domain with compute resources in the host.

2. The peripheral I/O device of claim 1, wherein the plurality of compute resources comprises a programmable logic (PL) array, wherein a first plurality of PL blocks in the PL array are assigned to the I/O domain and a second plurality of PL blocks in the PL array are assigned to the coherent domain.

3. The peripheral I/O device of claim 2, wherein the plurality of compute resources comprises a plurality of memory blocks, wherein a first subset of the plurality of memory blocks are assigned to the I/O domain and a second subset of the plurality of memory blocks are assigned to the coherent domain, wherein the first subset of the plurality of memory blocks can communicate with the first plurality of PL blocks but not the second plurality of PL blocks and the second subset of the plurality of memory blocks can communicate with the second plurality of PL blocks but not the first plurality of PL blocks.

4. The peripheral I/O device of claim 1, wherein the I/O hardware comprises an I/O interconnect layer configured to identify I/O data traffic in data received from the host, and wherein the coherent hardware comprises:
an coherent interconnect layer configured to identify coherent data traffic in the data received from the host and convert the coherent data traffic from a PCI protocol into a coherent interconnect protocol, and
a coherency processing engine coupled to the coherent interconnect layer and configured to convert the coherent data traffic from the coherent interconnect protocol into an instruction set architecture (ISA) specific interconnect protocol.

5. The peripheral I/O device of claim 4, wherein the coherency processing engine comprises:
a plurality of bridges coupled to a multiple coherent interconnect layers, wherein the plurality of bridges converts the coherent data traffic from the coherent interconnect protocol into the ISA specific interconnect protocol; and
a mesh coupled to the plurality of bridges and to the second subset of the plurality of compute resources.

6. The peripheral I/O device of claim 4, wherein the I/O hardware comprises a direct memory access (DMA) engine coupled to the I/O interconnect layer.

7. The peripheral I/O device of claim 1, wherein the hybrid gateway comprises a gateway network on chip (NoC) communicatively coupled to the I/O hardware and the coherent hardware.

8. The peripheral I/O device of claim 1, further comprising:
a NoC coupled to the first and second subsets of the plurality of compute resources, wherein the NoC is configurable such that I/O data traffic flowing through the NoC is treated differently from coherent data traffic flowing through the NoC.

9. The peripheral I/O device of claim 8, wherein the NoC is configurable to provide at least one of (i) a different quality of service (QoS), (ii) latency, and (iii) bandwidth for the I/O data traffic relative to the coherent data traffic.

10. A method, comprising:
receiving an indication of a first amount of compute resources in a peripheral I/O device to assign to an I/O domain;
receiving an indication of a second amount of compute resources in the peripheral I/O device to assign to a coherent domain;
configuring the peripheral I/O device to include the I/O domain and the coherent domain; and
operating the peripheral I/O device using the I/O domain and the coherent domain in parallel, wherein the peripheral I/O device includes a hybrid gateway that permits a host to communicate with the compute resources in the I/O domain and the coherent domain, and wherein the second amount of compute resources shares the coherent domain with compute resources in the host.

11. The method of claim 10, wherein the peripheral I/O device comprises a programmable logic (PL) array, wherein configuring the peripheral I/O device comprises:
assigning a first plurality of PL blocks in the PL array to the I/O domain and a second plurality of PL blocks in the PL array to the coherent domain.

12. The method of claim 11, wherein the peripheral I/O device comprises a plurality of memory blocks, wherein configuring the peripheral I/O device comprises:
assigning a first subset of the plurality of memory blocks to the I/O domain and a second subset of the plurality of memory blocks to the coherent domain, wherein the first subset of the plurality of memory blocks can communicate with the first plurality of PL blocks but not the second plurality of PL blocks and the second subset of the plurality of memory blocks can communicate with the second plurality of PL blocks but not the first plurality of PL blocks.

13. The method of claim 10, wherein operating the peripheral I/O device comprises:
receiving data from the host, wherein the data comprises both I/O data traffic and coherent data traffic;
identifying, using the hybrid gateway, the coherent data traffic in the data received from the host;
converting the coherent data traffic from a PCI protocol into a coherent interconnect protocol; and
converting the coherent data traffic from the coherent interconnect protocol into an instruction set architecture (ISA) specific interconnect protocol; and
forwarding the coherent data traffic to the second amount of compute resources.

14. The method of claim 13, wherein operating the peripheral I/O device comprises:
identifying, using the hybrid gateway, the I/O data traffic in the data received from the host; and
forwarding the I/O data traffic to a DMA engine.

15. The method of claim 10, wherein configuring the peripheral I/O device comprises:
setting parameters corresponding to a NoC that result in I/O data traffic being treated differently from coherent data traffic when traversing the NoC.

16. The method of claim 10, further comprising, after operating the peripheral I/O device using the I/O domain and the coherent domain in parallel:
receiving an indication of a third amount of compute resources in the peripheral I/O device different from the first amount to assign to the I/O domain;
receiving an indication of a fourth amount of compute resources in the peripheral I/O device different from the second amount to assign to the coherent domain; and
reconfiguring the peripheral I/O device so that the I/O domain has the third amount and the coherent domain has the fourth amount.

17. A system on chip (SoC), comprising:
a PL array comprising a plurality of PL blocks; and
a hybrid gateway configured to communicatively couple the SoC to a host, the hybrid gateway comprising:
I/O hardware configured to permit the host to transmit I/O data traffic to a first subset of the plurality of PL blocks which are assigned to an I/O domain, and
coherent hardware configured to permit the host to transmit coherent data traffic to a second subset of the plurality of PL blocks which are assigned to a coherent domain, wherein the first and second subsets are mutually exclusive.

18. The SoC of claim 17, further comprising:
a plurality of memory blocks, wherein a first subset of the plurality of memory blocks are assigned to the I/O domain and a second subset of the plurality of memory blocks are assigned to the coherent domain, wherein the first subset of the plurality of memory blocks can communicate with the first subset of the plurality PL blocks but not the second subset of the plurality of PL blocks and the second subset of the plurality of memory blocks can communicate with the second subset of the plurality of PL blocks but not the first subset of the plurality of PL blocks.

19. The SoC of claim 17, wherein the I/O hardware comprises an I/O interconnect layer configured to identify I/O data traffic in data received from the host, and
wherein the coherent hardware comprises:
an coherent interconnect layer configured to identify coherent data traffic in the data received from the host and convert the coherent data traffic from a PCI protocol into a coherent interconnect protocol, and
a coherency processing engine coupled to the coherent interconnect layer and configured to convert the coherent data traffic from the coherent interconnect protocol into an instruction set architecture (ISA) specific interconnect protocol.

20. The SoC of claim 19, wherein the coherency processing engine comprises:
a plurality of bridges coupled to a multiple coherent interconnect layers, wherein the plurality of bridges converts the coherent data traffic from the coherent interconnect protocol into the ISA specific interconnect protocol; and
a mesh coupled to the plurality of bridges and to the second subset of the plurality of PL blocks.

* * * * *

UNITED STATES PATENT AND TRADEMARK OFFICE
CERTIFICATE OF CORRECTION

PATENT NO. : 10,817,455 B1
APPLICATION NO. : 16/380860
DATED : October 27, 2020
INVENTOR(S) : Dastidar et al.

Page 1 of 1

It is certified that error appears in the above-identified patent and that said Letters Patent is hereby corrected as shown below:

In the Claims

Column 16, Line 33, Claim 18, after "plurality" insert -- of --.

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*